(12) United States Patent
Cho et al.

(10) Patent No.: US 9,951,229 B2
(45) Date of Patent: Apr. 24, 2018

(54) ANTI-REFLECTIVE COATING COMPOSITION INCLUDING SILOXANE COMPOUND, AND ANTI-REFLECTIVE FILM OF WHICH SURFACE ENERGY IS ADJUSTED USING SAME

(71) Applicant: LG Hausys, Ltd., Seoul (KR)

(72) Inventors: Hong-Kwan Cho, Anyang-si (KR); Won-Kook Kim, Daejeon (KR)

(73) Assignee: LG HAUSYS, LTD., Seoul (KR)

( * ) Notice: Subject to any disclaimer, the term of this patent is extended or adjusted under 35 U.S.C. 154(b) by 10 days.

(21) Appl. No.: 14/438,058

(22) PCT Filed: Oct. 8, 2013

(86) PCT No.: PCT/KR2013/008984
§ 371 (c)(1),
(2) Date: Apr. 23, 2015

(87) PCT Pub. No.: WO2014/069808
PCT Pub. Date: May 8, 2014

(65) Prior Publication Data
US 2015/0274983 A1 Oct. 1, 2015

(30) Foreign Application Priority Data
Oct. 30, 2012 (KR) .................. 10-2012-0121621

(51) Int. Cl.
| | | |
|---|---|---|
| C09D 5/00 | (2006.01) | |
| C09D 183/04 | (2006.01) | |
| G02B 1/111 | (2015.01) | |
| C09D 183/08 | (2006.01) | |
| C08K 7/26 | (2006.01) | |
| G06F 3/041 | (2006.01) | |
| C08G 77/24 | (2006.01) | |

(52) U.S. Cl.
CPC ........... C09D 5/006 (2013.01); C09D 183/04 (2013.01); C09D 183/08 (2013.01); G02B 1/111 (2013.01); C08G 77/24 (2013.01); C08K 7/26 (2013.01); G06F 3/0412 (2013.01); Y10T 428/12042 (2015.01)

(58) Field of Classification Search
CPC .... C09D 5/006; C09D 183/04; C09D 183/08; G02B 1/111; Y10T 428/12042; C08G 77/24; C08K 7/26; G06F 3/0412
See application file for complete search history.

(56) References Cited

U.S. PATENT DOCUMENTS

| | | | | |
|---|---|---|---|---|
| 8,039,065 B2* | 10/2011 | Ikeda | ..................... | G02B 1/111 349/137 |
| 2007/0146887 A1 | 6/2007 | Ikeda et al. | | |
| 2007/0266896 A1* | 11/2007 | Suwa | ..................... | C09D 5/006 106/287.16 |
| 2009/0205360 A1* | 8/2009 | Haley | ..................... | F04D 17/122 62/498 |
| 2009/0214796 A1* | 8/2009 | Okaniwa | ................ | G02B 1/113 427/444 |
| 2010/0036012 A1* | 2/2010 | Kimura | ...................... | C08F 2/44 522/172 |
| 2015/0175809 A1* | 6/2015 | Cho | ........................... | C08J 5/18 359/601 |
| 2015/0274983 A1* | 10/2015 | Cho | ..................... | C09D 183/02 428/550 |
| 2015/0301231 A1* | 10/2015 | Yang | ...................... | G02B 1/111 428/313.9 |

FOREIGN PATENT DOCUMENTS

| | | |
|---|---|---|
| CN | 1412577 A | 4/2003 |
| CN | 1969023 A | 5/2007 |
| CN | 101957461 A | 1/2011 |
| JP | 2000233467 A | 8/2000 |
| JP | 2002200690 A | 7/2002 |
| JP | 2004258267 A | 9/2004 |
| JP | 2007500374 A | 1/2007 |
| JP | 2007148201 A | 6/2007 |

(Continued)

OTHER PUBLICATIONS

Korean Notice of Allowance dated May 20, 2015 in connection with the counterpart Korean Patent Application No. 10-2012-0121621, citing the above reference(s).
International Search Report for PCT/KR2013/008984 dated Dec. 17, 2013, citing the above reference(s).
Office Action dated Jul. 22, 2016 from SIPO in connection with the corresponding Chinese patent application No. 201380057163.7, citing the above reference(s).
Chinese Office Action dated Mar. 8, 2017 for Chinese Patent Application No. 201380057163.7, citing the above reference(s).
Taiwanese Office Action dated Mar. 15, 2017 for Taiwanese Patent Application No. 102139372, citing the above reference(s).

(Continued)

*Primary Examiner* — Jonathan C Langman
(74) *Attorney, Agent, or Firm* — Hauptman Ham, LLP

(57) ABSTRACT

The present invention relates to an anti-reflective coating composition, to an anti-reflective film using same, and to a method for preparing the anti-reflective film, wherein the anti-reflective coating composition is capable of forming a coating layer that has a low refractive index and adjusting the surface energy. More particularly, the present invention relates to an anti-reflective film of which the reflectance is minimized and the surface energy is adjusted, by forming a coating layer using an anti-reflective coating composition that contains, as a binder, a siloxane compound which is synthesized by reacting organosilane that has a fluroalky group with alkoxysilane at a certain weight ratio, and also relates to a method for preparing the anti-reflective film. The anti-reflective film using the anti-reflective coating composition has excellent anti-reflective performance, and is thus expected to be applicable to various display devices such as a touch film.

16 Claims, No Drawings

(56) References Cited

FOREIGN PATENT DOCUMENTS

| | | |
|---|---|---|
| JP | 2008058348 A | 3/2008 |
| JP | 2010085579 A | 4/2010 |
| JP | 2010202857 A | 9/2010 |
| JP | 2012108394 A | 6/2012 |
| JP | 5046482 B2 | 10/2012 |
| KR | 20040070225 A | 8/2004 |
| KR | 1020060111622 A | 10/2006 |
| KR | 20070022311 A | 2/2007 |
| KR | 20090118724 A | 11/2009 |
| KR | 20100112740 A | 10/2010 |
| TW | 200525175 A | 8/2005 |

OTHER PUBLICATIONS

Jiang Lei et al, Biomimetic Intelligent Nanoscale Interface Materials, Chemical Industry Press, May 2007, P92-95, Beijing.

Chinese Office Action dated Oct. 16, 2017 in connection with the counterpart Chinese patent application No. 201380057163.7, citing the above reference(s).

Japanese Office Action dated Sep. 5, 2017 in connection with the counterpart Japanese Patent Application No. 2015-539496, citing the above reference(s).

\* cited by examiner

ANTI-REFLECTIVE COATING COMPOSITION INCLUDING SILOXANE COMPOUND, AND ANTI-REFLECTIVE FILM OF WHICH SURFACE ENERGY IS ADJUSTED USING SAME

CROSS REFERENCE TO RELATED APPLICATION

This application claims the priority of Korean Patent Application No. 10-2012-0121621 filed on Oct. 30, 2012 in the Korean Patent and Trademark Office. Further, this application is the National Phase application of International Application No. PCT/KR2013/008984 filed on Oct. 8, 2013, which is incorporated herein by reference in its entirety.

TECHNICAL FIELD

The present invention relates to an anti-reflective coating composition, which can form a coating layer having a low index of refraction and adjusted surface energy, an anti-reflective film using the same, and a method for manufacturing the anti-reflective film. More particularly, the present invention relates to an anti-reflective film having minimized reflectance and adjusted surface energy by forming a coating layer using an anti-reflective coating composition including a siloxane compound, which is prepared by reacting a fluoroalkyl group-containing organosilane with an alkoxy silane in a certain weight ratio, as a binder, and to a method for manufacturing the same.

BACKGROUND ART

When a display is exposed to external light such as various illumination and natural light, an image formed inside the display is not clearly focused on an eye, thereby causing deterioration in contrast of the display. Due to such deterioration in contrast, a person has a difficulty in viewing a screen, and feels fatigue in the eye, or suffers from a headache. For this reason, there is a strong demand for anti-reflection.

In a substrate on which a single-layer anti-reflective film is formed, when an index of refraction of the substrate is defined as ns and an index of refraction of the single-layer anti-reflective film is defined as n, a minimum value of reflectance R of the anti-reflective film is represented by $(n_s-n^2)^2/(n_s+n^2)^2$. Since the reflectance R has the minimum value under the condition of $n^2=n_s$, the single-layer anti-reflective film has lower reflectance as the index of refraction n thereof is closer to $(n_s)^{1/2}$. Generally, considering that an index of refraction $n_s$ of polyethylene terephthalate used as a substrate in transparent conductive films is about 1.54, it is desirable that an index of refraction n of an anti-reflective film be as close to a range of about 1.22 to about 1.24 as possible in order to reduce a reflectance R of the anti-reflective film.

In typical anti-reflective films, an anti-reflective layer is mainly disposed on a transparent substrate. For example, Japanese Patent Publication No. 2002-200690 discloses a 3-layer structure in which a hard coating layer, a 1 μm or less thick high index of refraction layer and a low index of refraction layer are stacked in order from a transparent substrate.

In addition, to simplify a manufacturing process, Japanese Patent Publication No. 2000-233467 discloses a 2-layer structure in which the hard coating layer and the low index of refraction layer are stacked with omission of the high index of refraction layer from the anti-reflective layer as set forth above.

Due to development of hollow silica particles, which are a low refractive material, low refractive coating materials having an extremely low index of refraction have been studied. However, a low refractive coating material developed using an existing acrylic resin has not reached an index of refraction of 1.22 to 1.24, which is a theoretically optimum value for anti-refraction. To improve this problem, although efforts to reduce an index of refraction by addition of a fluorine-containing polymer material have been made, there occurred a problem of excessively high surface energy of a coating surface. In addition, since compatibility between the hollow silica particles and the acrylic resin is not good, in order to overcome this problem, the silica particles need to be subjected to surface treatment allowing the particles to be bound to the acrylic resin.

Korean Patent Publication No. 2004-0070225 discloses a coating composition including a silica precursor obtained by hydrolysis and polycondensation of an alkoxy silane. However, since a method of condensation and thermal curing of a silane compound does not provide sufficient curing only by low-temperature and short-term thermal curing, high-temperature or long-time curing is required for sufficient curing density of the silane compound. Thus, the method has problems such as increased manufacturing costs, deteriorated productivity, damage to a plastic film substrate, cracking of a hard coating layer due to shrinkage thereof by heating, and the like.

In addition, although a technique for manufacturing a low refractive coating layer by introduction of a fluorine-containing alkoxy silane is also considered, there is a limit in applying the technique due to problems, such as phase separation and the like.

In manufacture of touch sensor panels and the like, it is necessary to impart suitable adhesion to a film surface, and control of adhesion of a surface of a coating layer by adjustment of surface energy of the coating layer may be considered for this purpose.

Therefore, there is a continuous need for development of a method which allows a silica coating layer having a low index of refraction and suitable surface energy to be formed on a substrate without phase separation.

DISCLOSURE

Technical Problem

With continuous studies and efforts for development of an anti-reflective film in which a silica coating layer having a low index of refraction and suitable surface energy is formed on a substrate, the inventors of the present invention have found that, when a coating liquid including a siloxane compound binder prepared by reacting a fluoroalkyl group-containing organosilane with an alkoxy silane in a certain ratio was used, an anti-reflective film, which has a low index of refraction and a suitable water contact angle on a surface of a coating layer, could be manufactured without phase separation, thereby completing the present invention.

Therefore, it is an aspect of the present invention to provide an anti-reflective film, which exhibits excellent optical properties and adjusted surface energy by forming an anti-reflective layer using a coating liquid including a siloxane compound binder prepared through reaction of a fluoroalkyl group-containing organosilane with an alkoxy silane in a certain ratio, and a method for manufacturing the anti-reflective film.

Technical Solution

In accordance with one aspect of the present invention, an anti-reflective coating composition includes: a binder formed by polymerization of 100 parts by weight of a silane compound represented by Formula 1 and 0.1 parts by weight to 20 parts by weight of an organosilane compound represented by Formula 2; and hollow silica particles.

$$R^1_x Si(OR^2)_{4-x} \qquad \text{[Formula 1]}$$

wherein $R^1$ is a $C_1$ to $C_{10}$ alkyl group, a $C_6$ to $C_{10}$ aryl group or a $C_3$ to $C_{10}$ alkenyl group, $R^2$ is a $C_1$ to $C_6$ alkyl group, and x is an integer satisfying 0≤x<4.

$$R^3_y Si(OR^4)_{4-y} \qquad \text{[Formula 2]}$$

wherein $R^3$ is a $C_1$ to $C_{12}$ fluoroalkyl group, $R^4$ is a $C_1$ to $C_6$ alkyl group, and y is an integer satisfying 0≤x<4.

In accordance with another aspect of the present invention, an anti-reflective film includes a coating layer formed by coating the coating composition as set forth above onto a surface of a substrate, wherein the coating layer has a water contact angle of 40° to 80° on a surface thereof.

In accordance with a further aspect of the present invention, a method for manufacturing an anti-reflective film includes: preparing a binder by polymerization of 100 parts by weight of a silane compound represented by Formula 1 and 0.1 parts by weight to 20 parts by weight of an organosilane compound represented by Formula 2; preparing a coating composition including surface-treated hollow silica particles by adding the binder and an acid catalyst to hollow silica particles; coating the coating composition onto at least one surface of a base film; and performing heat treatment of the coated coating composition.

Advantageous Effects

According to the present invention, an anti-reflective coating layer, which has a low index of refraction and suitable surface energy while overcoming a typical problem of phase separation, can be formed using the anti-reflective coating composition.

The anti-reflective film using the anti-reflective coating composition can be applied to various displays such as touch films and the like due to excellent anti-reflection effects thereof.

BEST MODE

The above and other aspects, features, and advantages of the present invention will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art. The scope of the invention should be defined only by the accompanying claims and equivalents thereof.

Hereinafter, an anti-reflective coating composition, an anti-reflective film and a method for manufacturing the anti-reflective film according to the present invention will be described in detail.

Anti-Reflective Coating Composition

In accordance with one aspect of the present invention, an anti-reflective coating composition includes: a binder formed by polymerization of 100 parts by weight of a silane compound represented by Formula 1 and 0.1 parts by weight to 20 parts by weight of an organosilane compound represented by Formula 2; and hollow silica particles.

$$R^1_x Si(OR^2)_{4-x} \qquad \text{[Formula 1]}$$

wherein $R^1$ is a $C_1$ to $C_{10}$ alkyl group, a $C_6$ to $C_{10}$ aryl group or a $C_3$ to $C_{10}$ alkenyl group, $R^2$ is a $C_1$ to $C_6$ alkyl group, and x is an integer satisfying 0≤x<4.

$$R^3_y Si(OR^4)_{4-y} \qquad \text{[Formula 2]}$$

wherein $R^3$ is a $C_1$ to $C_{12}$ fluoroalkyl group, $R^4$ is a $C_1$ to $C_6$ alkyl group, and y is an integer satisfying 0≤x<4.

The anti-reflective coating composition has a lower index of refraction and thus exhibits improved anti-reflection. Since the hollow silica particles have a low index of refraction due to a hollow structure therein, a layer realizing a low index of refraction can be formed from the hollow silica-containing anti-reflective coating composition. Generally, a fluorine-containing coating composition is used to reduce an index of refraction. In this case, there can be a problem of reduction in adhesion, which is required upon formation of a layer in a stack structure, due to reduction in surface energy. On the other hand, the anti-reflective coating composition as set forth above can form a layer which has relatively high surface energy while realizing a low index of refraction. The anti-reflective coating composition includes the silane compound represented by Formula 1 and the organosilane compound represented by Formula 2 in the content ratio as set forth above, thereby allowing surface energy not to be reduced while realizing a low index of refraction.

The silane compound represented by Formula 1 may be a tetrafunctional alkoxy silane having four alkoxy groups when x is 0; a trifunctional alkoxy silane having three alkoxy groups when x is 1; and a bifunctional alkoxy silane having two alkoxy groups when x is 2. The silane compound represented by Formula 1 when x is 3 is not advantageous in condensation with the organosilane compound represented by Formula 2 since the silane compound has only one alkoxy group which is a functional group.

In Formula 1, the $C_6$ to $C_{10}$ aryl group may include a phenyl group, a tolyl group and the like, and the $C_3$ to $C_{10}$ alkenyl group may include an allyl group, a 1-propenyl group, a 1-butenyl group, a 2-butenyl group, a 3-butenyl group and the like.

The silane compound may include at least one compound selected from among tetramethoxysilane, tetraethoxysilane, tetrapropoxysilane, tetraisopropoxysilane, tetra-n-butoxysilane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, vinyltrimethoxysilane, vinyltriethoxysilane, allyltrimethoxysilane allyltriethoxysilane, dimethyldimethoxysilane, dimethyldiethoxysilane, diphenyldimethoxysilane, and diphenyldiethoxysilane, without being limited thereto.

In addition, the organosilane compound represented by Formula 2 may include at least one compound selected from among trifluoromethyltrimethoxysilane, trifluoromethyltriethoxysilane, trifluoropropyltrimethoxysilane, trifluoropropyltriethoxysilane, nonafluorobutylethyltrimethoxysilane, nonafluorobutylethyltriethoxysilane, nonafluorohexyltrimethoxysilane, nonafluorohexyltriethoxysilane, tridecafluorooctyltrimethoxysilane, tridecafluorooctyltriethoxysilane, heptadecafluorodecyltrimethoxysilane, and heptadecafluorodecyltriethoxysilane, without being limited thereto. In addition, it is advantageous that $R^3$ is a $C_3$ to $C_5$ fluoroalkyl group in terms of prevention of phase separation. A siloxane compound is formed by hydrolysis and dehydration condensation polymerization of the silane compound represented by Formula 1 and the organosilane compound represented by Formula 2. In hydrolysis and dehydration condensation polymerization, an acid catalyst may be used. Specifically, nitric acid, hydrochloric acid, sulfuric acid, acetic acid or the like may be used.

In polymerization, the organosilane compound represented by Formula 2 is used in an amount of 0.1 parts by weight to 20 parts by weight, preferably 1 part by weight to 15 parts by weight, more preferably 5 parts by weight to 10 parts by weight, based on 100 parts by weight of the silane compound represented by Formula 1. If the amount of the organosilane compound is less than 0.1 parts by weight, there are problems in that a formed coating layer has an excessively low contact angle and provides insignificant reduction in index of refraction, and if the amount of the organosilane compound is greater than 20 parts by weight, there are problems in that the coating layer can have an excessively large contact angle and an increased index of refraction. Thus, the amount of the organosilane compound represented by Formula 2 may be adjusted within the range as set forth the above depending upon a required water contact angle.

The formed siloxane compound acts as an organic-inorganic hybrid binder and thus serves to treat a surface of the hollow silica particles. As such, if the hollow silica particles are subjected to surface treatment with the binder, the coating layer can have a further reduced index of refraction.

The siloxane compound has a weight average molecular weight of 1,000 to 100,000, preferably 2,000 to 50,000, more preferably 5,000 to 20,000. If the weight average molecular weight is less than 1,000, it is difficult to form a coating layer having a desired low index of refraction, and if the weight average molecular weight is greater than 100,000, there is a problem of deterioration in light transmittance of an anti-reflective film.

The hollow silica particles refer to silica particles which are derived from a silicon compound or an organic silicon compound and have an empty space on a surface thereof and/or therein. As described above, since the hollow silica particles have an empty space therein, the coating layer can realize a lower index of refraction.

The hollow silica particles may be dispersed in a dispersion medium (water or organic solvent) to form a colloid having a solid content of 5% by weight (wt %) to 40 wt %. Here, an organic solvent capable of being used as the dispersion medium may include: alcohols such as methanol, isopropyl alcohol (IPA), ethylene glycol, butanol, and the like; ketones such as methyl ethyl ketone, methyl isobutyl ketone (MIBK), and the like; aromatic hydrocarbons such as toluene, xylene, and the like; amides such as dimethyl formamide, dimethyl acetamide, N-methyl pyrrolidone, and the like; esters such as ethyl acetate, butyl acetate, γ-butyrolactone, and the like; ethers such as tetrahydrofuran, 1,4-dioxane, and the like; and mixtures thereof. However, when a colloid solution in which the hollow silica particles are dispersed in a dispersion medium is used, it is desirable that the amount of the hollow silica be adjusted within the range as set forth above in consideration of solid content and the like.

In addition, it is advantageous in maintenance of transparency of a film and in exhibition of anti-reflection thereof that the hollow silica particles have a number average diameter of 1 nm to 1,000 nm, preferably 5 nm to 500 nm, more preferably 10 nm to 100 nm.

The binder of the siloxane compound is present in an amount of 10 parts by weight to 120 parts by weight, preferably 20 parts by weight to 100 parts by weight, more preferably 40 parts by weight to 80 parts by weight, based on 100 parts by weight of the hollow silica particles. If the amount of the binder is less than 10 parts by weight, there is a problem of whitening of a coating surface, and if the amount of the binder is greater than 120 parts by weight, there is a problem of significant deterioration in anti-reflection of the coating layer.

The coating composition may include an acid catalyst to promote surface treatment of the hollow silica particles with the binder, and the acid catalyst may be any acid catalyst generally used in the art without limitation. Preferably, the acid catalyst is nitric acid or hydrochloric acid. The acid catalyst may be present in an amount of 0.1 parts by weight to 20 parts by weight based on 100 parts by weight of the hollow silica particles.

In manufacture of the anti-reflective coating composition, it is advantageous that the coating composition have a pH of 2 to 9, preferably 3 to 8, more preferably 4 to 7 in terms of adjustment of contact angle.

The anti-reflective coating composition may further include a pH control agent for pH control thereof. If $OH^-$ ions in the composition are increased due to the pH control agent, a water contact angle of the composition can be reduced. The pH control agent may include ammonia, organic amines, metal hydroxide (LiOH, KOH, NaOH) solutions, and the like.

Anti-Reflective Film

In accordance with another aspect of the present invention, there is provided an anti-reflective film formed by coating the anti-reflective coating composition as set forth above onto a surface of a substrate.

The substrate may include various substrates, such as transparent polymer resins and the like, used for typical liquid crystal displays and the like. Specifically, the substrate may include polyethylene terephthalate (PET), polyethylene naphthalate (PEN), polyethersulfone (PES), polycarbonate (PC), polypropylene (PP), norbornene resins, and the like.

When a material of the substrate is PET, a PET film has a thickness of about 10 μm to about 200 μm, preferably about 20 μm to about 100 μm. If the thickness of the transparent substrate is less than about 10 μm, the substrate has a problem in mechanical strength, and if the thickness of the transparent substrate is greater than about 200 μm, there is a possibility that the substrate does not exhibit improved touch properties as a substrate for touch panels.

The coating layer formed of the anti-reflective coating composition may have a water contact angle of 40° to 80° on a surface thereof. If the water contact angle is less than 40°, a protective film and the like are not separated well from the coating layer and the coating layer has a problem in terms of anti-contamination, and if the water contact angle is greater than 80°, it is difficult to apply the coating layer to touch panels and the like due to problems in terms of adhesion of the surface of the coating layer.

In addition, the coating layer formed of the anti-reflective coating composition has an index of refraction of 1.20 to 1.25.

Further, the coating layer has a thickness of 1 nm to 1,000 nm, preferably 10 nm to 500 nm. If the thickness is less than 1 nm, there is a problem of insignificant anti-reflection of the coating layer, and if the thickness is greater than 1,000 nm, there is a problem of deterioration in adhesion of the coating layer.

According to the present invention, the anti-reflective film has a transmittance of 94% or more and a luminous reflectance of 0.5% to 2.0%, and thus can exhibit excellent anti-reflection.

Method for Manufacturing Anti-Reflective Film

In accordance with a further aspect of the present invention, a method for manufacturing an anti-reflective film includes: preparing a binder by polymerization of 100 parts by weight of a silane compound represented by Formula 1 and 0.1 parts by weight to 20 parts by weight of an organosilane compound represented by Formula 2; preparing a coating composition including surface-treated hollow silica particles by adding the binder and an acid catalyst to hollow silica particles; coating the coating composition onto at least one surface of a base film; and performing heat treatment of the coated coating composition.

The binder may be prepared as a siloxane compound by mixing 0.1 parts by weight to 20 parts by weight of the organosilane compound represented by Formula 2 with 100 parts by weight of the silane compound represented by Formula 1 in the presence of an acid catalyst, followed by dehydration and polymerization.

The prepared binder is mixed with the hollow silica particles in a solvent in the presence of the acid catalyst, and used in surface treatment of the hollow silica particles. As such, the hollow silica particles are subjected to surface treatment, whereby the anti-reflective film can have a further reduced index of refraction. The binder and the hollow silica particles are mixed at 20° C. to 40° C. for about 5 hours to about 50 hours, preferably 10 hours to 40 hours, more preferably 20 hours to 30 hours while stirred.

As described above, the coating composition may include 10 parts by weight to 120 parts by weight of the binder and 0.1 parts by weight to 20 parts by weight of the acid catalyst, based on 100 parts by weight of the hollow silica particles.

In addition, in preparation of the coating composition, the coating composition is controlled to a pH of 2 to 9, preferably 3 to 8, more preferably 4 to 7. Further, a pH control agent and the like may be used for pH control of the coating composition, and the pH control agent may include ammonia, organic amines, metal hydroxide (LiOH, KOH, NaOH) solutions and the like.

The coating composition obtained through mixing as set forth above is coated onto the at least one surface of the base film. Here, coating may be performed by one method selected from among gravure coating, slot die coating, spin coating, spray coating, bar coating, and dip coating, without being limited thereto.

The coating composition may be coated to a thickness of 1 nm to 1,000 nm onto the one surface of the base film, followed by heat treatment at 50° C. to 200° C., thereby forming an anti-reflective layer. Specifically, the coated coating composition may be dried at a high temperature of 100° C. to 200° C. for about 1 minute to about 10 minutes to remove the solvent, followed by aging at 50° C. to 100° C. for about 10 hours to 100 hours, thereby forming the anti-reflective layer.

Hereinafter, the present invention will be explained in more detail with reference to some examples.

It should be understood that these examples are provided for illustration only and are not to be construed in any way as limiting the present invention.

EXAMPLE 1

1. Preparation of Siloxane Compound Binder 26 parts by weight of water, 290 parts by weight of isopropanol and 9 parts by weight of 0.1 M $HNO_3$ were placed in a reactor, followed by stirring for 10 minutes. Next, 100 parts by weight of tetraethoxysilane (tetraethyl orthosilicate, TEOS) and 0.65 parts by weight of (3,3,3-trifluoropropyl)triethoxysilane were slowly introduced into the reactor through a funnel for 30 minutes. Next, the components were stirred at 50° C. for 2 hours, followed by cooling to room temperature, and then stirred again at a speed of 200 rpm for 24 hours, thereby obtaining a transparent binder solution. It was confirmed that the solution had a solid content of 6.7 wt % and a pH of 2.1. The transparent solution was used in manufacture of a coating composition in the following stage without a separate purification process.

2. Preparation of Anti-Reflective Coating Composition 100 parts by weight of the prepared binder solution, 60 parts by weight of a hollow silica particle-methyl isobutyl ketone dispersion sol (Thrulya 4320, JGC C&C Co., Ltd., 20% w/w) having a number average diameter of 60 nm and 1 part by weight of $NH_4OH$ were placed in a reactor, followed by stirring at room temperature for 24 hours, thereby preparing an anti-reflective coating composition. It was confirmed that the prepared anti-reflective coating composition had a solid content of 3 wt % and a pH of 4.2.

3. Manufacture of Anti-Reflective Film

The prepared anti-reflective coating composition was coated to a thickness of 100 nm onto a 20 μm thick PET film using a Mayer bar, followed by drying at 130° C. for 2 minutes, thereby forming an anti-reflective coating layer. Next, the anti-reflective coating layer was subjected to aging in an oven at 60° C. for 24 hours, thereby manufacturing a final anti-reflective film.

EXAMPLE 2

An anti-reflective coating composition and an anti-reflective film were manufactured in the same manner as in Example 1 except that 1.3 parts by weight of (3,3,3-trifluoropropyl)triethoxysilane was used.

EXAMPLE 3

An anti-reflective coating composition and an anti-reflective film were manufactured in the same manner as in Example 1 except that 2.7 parts by weight of (3,3,3-trifluoropropyl)triethoxysilane was used.

EXAMPLE 4

An anti-reflective coating composition and an anti-reflective film were manufactured in the same manner as in Example 1 except that 3.4 parts by weight of (3,3,3-trifluoropropyl)triethoxysilane was used.

EXAMPLE 5

An anti-reflective coating composition and an anti-reflective film were manufactured in the same manner as in Example 1 except that 5.4 parts by weight of (3,3,3-trifluoropropyl)triethoxysilane was used.

EXAMPLE 6

An anti-reflective coating composition and an anti-reflective film were manufactured in the same manner as in Example 1 except that 7.9 parts by weight of (3,3,3-trifluoropropyl)triethoxysilane was used.

EXAMPLE 7

An anti-reflective coating composition and an anti-reflective film were manufactured in the same manner as in Example 1 except that 13.3 parts by weight of (3,3,3-trifluoropropyl)triethoxysilane was used.

EXAMPLE 8

An anti-reflective coating composition and an anti-reflective film were manufactured in the same manner as in Example 1 except that 7.9 parts by weight of (3,3,3-trifluoropropyl)triethoxysilane was used, and that NH$_4$OH was not used in preparation of the coating composition.

EXAMPLE 9

An anti-reflective coating composition and an anti-reflective film were manufactured in the same manner as in Example 1 except that 7.9 parts by weight of (3,3,3-trifluoropropyl)triethoxysilane was used, and that 60 parts by weight of a 60 nm hollow silica particle-isopropanol dispersion sol (Thrulya 4110, JGC C&C Co., Ltd., 20% w/w) was used and NH$_4$OH was not used in preparation of the coating composition.

COMPARATIVE EXAMPLE 1

An anti-reflective coating composition and an anti-reflective film were manufactured in the same manner as in Example 1 except that a binder was prepared by condensation polymerization of only tetraethoxysilane without use of (3,3,3-trifluoropropyl)triethoxysilane.

COMPARATIVE EXAMPLE 1

An anti-reflective coating composition and an anti-reflective film were manufactured in the same manner as in Example 1 except that 29 parts by weight of (3,3,3-trifluoropropyl)triethoxysilane was used.

Evaluation

1. Index of Refraction of Coating Layer

Index of refraction of the coating layer on the manufactured anti-reflective film was measured at wavelengths of 532 nm, 632.8 nm and 830 nm using a prism coupler, followed by calculation of index of refraction at 550 nm using Cauchy dispersion equation. Results are shown in Table 1.

TABLE 1

|  | Index of refraction |
| --- | --- |
| Example 1 | 1.23 |
| Example 2 | 1.23 |
| Example 3 | 1.23 |
| Example 4 | 1.23 |
| Example 5 | 1.23 |

TABLE 1-continued

|  | Index of refraction |
| --- | --- |
| Example 6 | 1.23 |
| Example 7 | 1.24 |
| Example 8 | 1.23 |
| Example 9 | 1.23 |
| Comparative Example 1 | 1.26 |
| Comparative Example 2 | 1.24 |

As shown in Table 1, it was confirmed that the coating layer could realize an index of refraction of 1.23 corresponding to a theoretically optimum value when the PET substrate was used.

2. Water Contact Angle

Water contact angle was measured on each of the anti-reflective films of Examples and Comparative Examples using an OCA200 contact angle tester (Dataphysics Co., Ltd.). Results are shown in Table 2.

TABLE 2

|  | Contact angle (°) |
| --- | --- |
| Example 1 | 44 |
| Example 2 | 47 |
| Example 3 | 52 |
| Example 4 | 55 |
| Example 5 | 58 |
| Example 6 | 64 |
| Example 7 | 75 |
| Example 8 | 69 |
| Example 9 | 43 |
| Comparative Example 1 | 15 |
| Comparative Example 2 | 95 |

As shown in Table 2, it could be confirmed that the coating layers of Examples had a water contact angle of 40° to 80° and the contact angle of the coating layer increased with increasing amount of (3,3,3-trifluoropropyl)triethoxysilane in the binder. In addition, it was confirmed that the coating layer had an increased contact angle due to reduction in pH when NH$_4$OH was not used. Thus, it was confirmed that the contact angle could be appropriately adjusted by adjusting the amount of the fluoroalkyl group-containing organosilane compound and the pH of the coating composition.

3. Transmittance and Minimum Reflectance

Transmittance of each of the manufactured anti-reflective films was measured using a CM-5 spectrophotometer (Konica Minolta Co., Ltd.). In addition, a back surface of each of the anti-reflective films was subjected to blackening treatment, followed by measurement of luminous reflectance and minimum reflectance. Results are shown in Table 3.

TABLE 3

|  | Transmittance (D65) (%) | Luminous reflectance (D65) (%) | Minimum reflectance (%) |
| --- | --- | --- | --- |
| Example 1 | 95.8 | 0.9 | 0.9 |
| Example 2 | 95.5 | 1.2 | 1.1 |
| Example 3 | 94.3 | 1.4 | 1.3 |
| Example 4 | 94.9 | 1.7 | 1.6 |
| Example 5 | 95.3 | 1.7 | 1.6 |
| Example 6 | 95.2 | 1.5 | 1.4 |
| Example 7 | 94.9 | 1.7 | 1.5 |
| Example 8 | 95.6 | 1.2 | 1.1 |
| Example 9 | 96.2 | 0.7 | 0.6 |

TABLE 3-continued

| | Transmittance (D65) (%) | Luminous reflectance (D65) (%) | Minimum reflectance (%) |
|---|---|---|---|
| Comparative Example 1 | 95.5 | 1.2 | 1.1 |
| Comparative Example 2 | 96.0 | 0.7 | 0.6 |

As shown in Table 3, the anti-reflective films of Examples had a transmittance of 94% or more, a luminous reflectance of 0.6% to 1.8%, and a minimum reflectance of 0.6% to 1.6%. From the results, it was confirmed that the anti-reflective films of Examples exhibited excellent anti-reflection.

Although the present invention has been described with reference to some embodiments, it should be understood that the embodiments are provided for illustrative purposes only, and that various modifications, changes, alterations, and equivalent embodiments can be made by those skilled in the art without departing from the spirit and scope of the invention. Therefore, the scope of the invention should be limited only by the accompanying claims and equivalents thereof.

The invention claimed is:

1. An anti-reflective coating composition comprising:
a binder formed by polymerization of 100 parts by weight of a silane compound represented by Formula 1 and 5 parts by weight to 10 parts by weight of an organosilane compound represented by Formula 2;
a pH control agent; and
hollow silica particles,
wherein the pH control agent includes one selected from the group consisting of ammonia, organic amines, metal hydroxide solution and a combination thereof,
wherein the composition has a pH of 3 to 8,
wherein the binder is a siloxane compound having a weight-averaged molecular weight of 1,000 to 100,000,

$$R^1{}_x Si(OR^2)_{4-x} \quad \text{[Formula 1]}$$

wherein $R^1$ is a $C_1$ to $C_{10}$ alkyl group, a $C_6$ to $C_{10}$ aryl group or a $C_3$ to $C_{10}$ alkenyl group, $R^2$ is a $C_1$ to $C_6$ alkyl group, and x is an integer satisfying 0≤x<4,

$$R^3{}_y Si(OR^4)_{4-y} \quad \text{[Formula 2]}$$

wherein $R^3$ is a $C_1$ to $C_{12}$ fluoroalkyl group, $R^4$ is a $C_1$ to $C_6$ alkyl group, and y is an integer satisfying 0≤x<4.

2. The coating composition according to claim 1, wherein the silane compound represented by Formula 1 comprises at least one compound selected from among tetramethoxysilane, tetraethoxysilane, tetrapropoxysilane, tetraisopropoxysilane, tetra-n-butoxysilane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, vinyltrimethoxysilane, vinyltriethoxysilane, allyltrimethoxysilane allyltriethoxysilane, dimethyldimethoxysilane, dimethyldiethoxysilane, diphenyldimethoxysilane, and diphenyldiethoxysilane.

3. The coating composition according to claim 1, wherein the organosilane compound represented by Formula 2 comprises at least one compound selected from among trifluoromethyltrimethoxysilane, trifluoromethyltriethoxysilane, trifluoropropyltrimethoxysilane, trifluoropropyltriethoxysilane, nonafluorobutylethyltrimethoxysilane, nonafluorobutylethyltriethoxysilane, nonafluorohexyltrimethoxysilane, nonafluorohexyltriethoxysilane, tridecafluorooctyltrimethoxysilane, tridecafluorooctyltriethoxysilane, heptadecafluorodecyltrimethoxysilane, and heptadecafluorodecyltriethoxysilane.

4. The coating composition according to claim 1, wherein x in Formula 1 is an integer of 0, 1, or 2.

5. The coating composition according to claim 1, wherein $R^3$ in Formula 2 is a $C_3$ to $C_5$ fluoroalkyl group.

6. The coating composition according to claim 1, wherein the hollow silica particles have a number average diameter of 1 nm to 1,000 nm.

7. The anti-reflective coating composition according to claim 1, further comprising:
a particle dispersion medium.

8. The anti-reflective coating composition according to claim 7, the particle dispersion medium comprises one or more of water or an organic solvent.

9. The anti-reflective coating composition according to claim 7, wherein a content of the hollow silica particles dispersed in the particle dispersion medium is 5% by weight to 40% by weight.

10. An anti-reflective film including a coating layer formed on a surface of a substrate comprising the anti-reflective coating composition according to claim 1, wherein the coating layer has a water contact angle of 40° to 80° on the surface thereof, wherein the coating layer has an index of refraction of 1.20 to 1.25.

11. The anti-reflective film according to claim 10, wherein the coating layer has a thickness of 1 nm to 1,000 nm.

12. The anti-reflective film according to claim 10, wherein the anti-reflective film has a transmittance of 94% or more and a luminous reflectance of 0.5% to 2.0%.

13. A touch panel comprising the anti-reflective film according to claim 10.

14. A method for manufacturing an anti-reflective film, comprising:
preparing a binder by polymerization of 100 parts by weight of a silane compound represented by Formula 1 and 5 parts by weight to 10 parts by weight of an organosilane compound represented by Formula 2;
preparing a coating composition comprising surface-treated hollow silica particles by adding the binder, a pH control agent and an acid catalyst to hollow silica particles, and adjusting the coating composition to a pH of 3 to 8;
coating the coating composition onto at least one surface of a base film; and
performing heat treatment of the coated coating composition,
wherein the pH control agent includes one selected from the group consisting of ammonia, organic amines, metal hydroxide solution and a combination thereof,
wherein the binder is a siloxane compound having a weight-averaged molecular weight of 1,000 to 100,000, $$R^1{}_x Si(OR^2)_{4-x} \quad \text{[Formula 1]}$$

wherein $R^1$ is a $C_1$ to $C_{10}$ alkyl group, a $C_6$ to $C_{10}$ aryl group or a $C_3$ to $C_{10}$ alkenyl group, $R^2$ is a $C_1$ to $C_6$ alkyl group, and x is an integer satisfying 0≤x<4, $$R^3{}_y Si(OR^4)_{4-y} \quad \text{[Formula 2]}$$

wherein $R^3$ is a $C_1$ to $C_{12}$ fluoroalkyl group, $R^4$ is a $C_1$ to $C_6$ alkyl group, and y is an integer satisfying 0≤x<4.

15. The method according to claim 14, wherein the coating composition is prepared by adding the binder and the acid catalyst to the hollow silica particles, followed by stirring at 20° C. to 40° C. for 5 hours to 50 hours.

16. The method according to claim 14, wherein heat treatment is performed at a temperature of 50° C. to 200° C.

* * * * *